United States Patent [19]

Krikorian

[11] Patent Number: 5,726,909
[45] Date of Patent: Mar. 10, 1998

[54] CONTINUOUS PLAY BACKGROUND MUSIC SYSTEM

[76] Inventor: Thomas M. Krikorian, 3750 Spanish Oaks Dr., West Bloomfield, Mich. 48323

[21] Appl. No.: 570,007

[22] Filed: Dec. 8, 1995

[51] Int. Cl.⁶ ...................................................... G06F 17/00
[52] U.S. Cl. .................................................... 364/514 R
[58] Field of Search ........................ 364/514 R; 455/4.2; 370/20.1; 379/105, 220, 230, 246, 67; 360/15; 369/85; 381/81, 85

[56] References Cited

U.S. PATENT DOCUMENTS

| | | | |
|---|---|---|---|
| 4,811,325 | 3/1989 | Sharples, Jr. et al. | 360/15 |
| 5,041,921 | 8/1991 | Scheffler. | |
| 5,057,915 | 10/1991 | Kohorn | 455/5 |
| 5,191,615 | 3/1993 | Aldava et al. | |
| 5,278,909 | 1/1994 | Edgar. | |
| 5,341,350 | 8/1994 | Frank et al. | |
| 5,355,302 | 10/1994 | Martin et al. | |
| 5,365,381 | 11/1994 | Scheffler. | |
| 5,440,644 | 8/1995 | Farionneli et al. | 381/85 |
| 5,541,638 | 7/1996 | Story | 455/4.2 |
| 5,541,917 | 7/1996 | Farris | 379/220 |
| 5,557,658 | 9/1996 | Gregorek et al. | 379/67 |

Primary Examiner—Ellis B. Ramirez
Attorney, Agent, or Firm—Gifford, Krass, Groh, Sprinkle, Patmore, Anderson & Citkowski, P.C.

[57] ABSTRACT

A continuous play broadcast system having a central computer with a master digital storage drive(s) containing a plurality of digitized files which represent a master library of musical selections and announcements. A plurality of end user computers are in communication with the central computer and contain respective subset quantities of digitized files which represent remote libraries. Each of the end user computers includes a display means, a digital to audio conversion means and an audio output means. Each end user computer further includes the ability to customize a continuous play output and to send requests to the central computer via the communication link. The central computer further includes an interface/update means and a compression circuit which is capable of updating the digitized audio files in the remote libraries of the end user computers at reduced time over desired intervals.

8 Claims, 4 Drawing Sheets

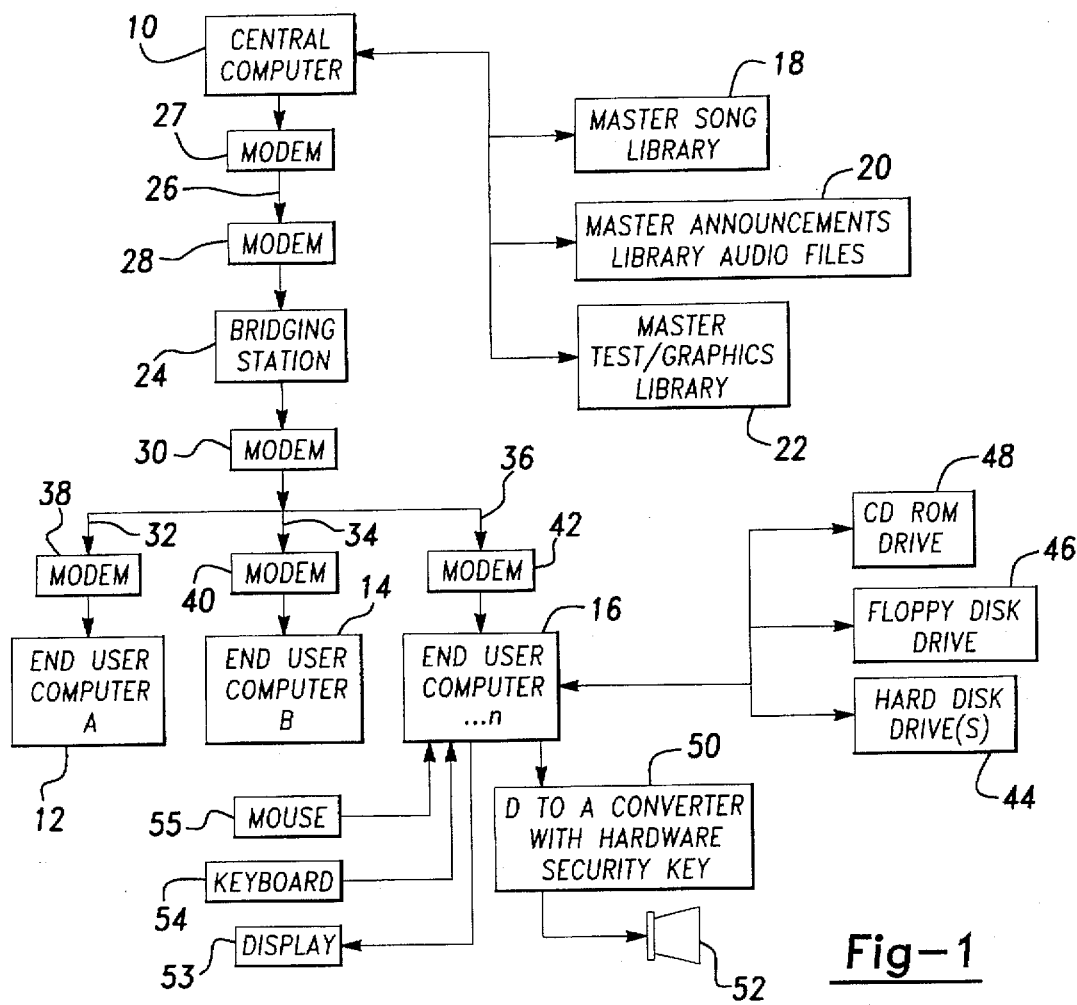
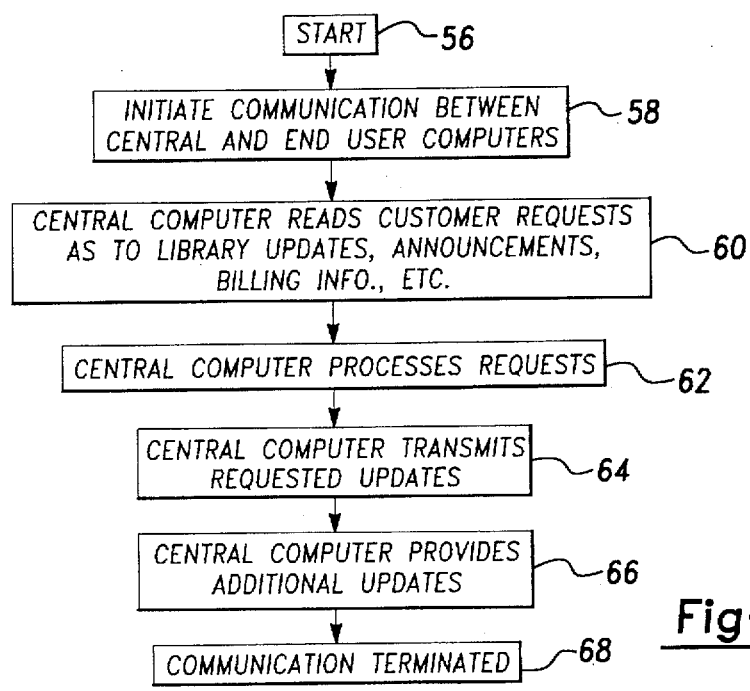

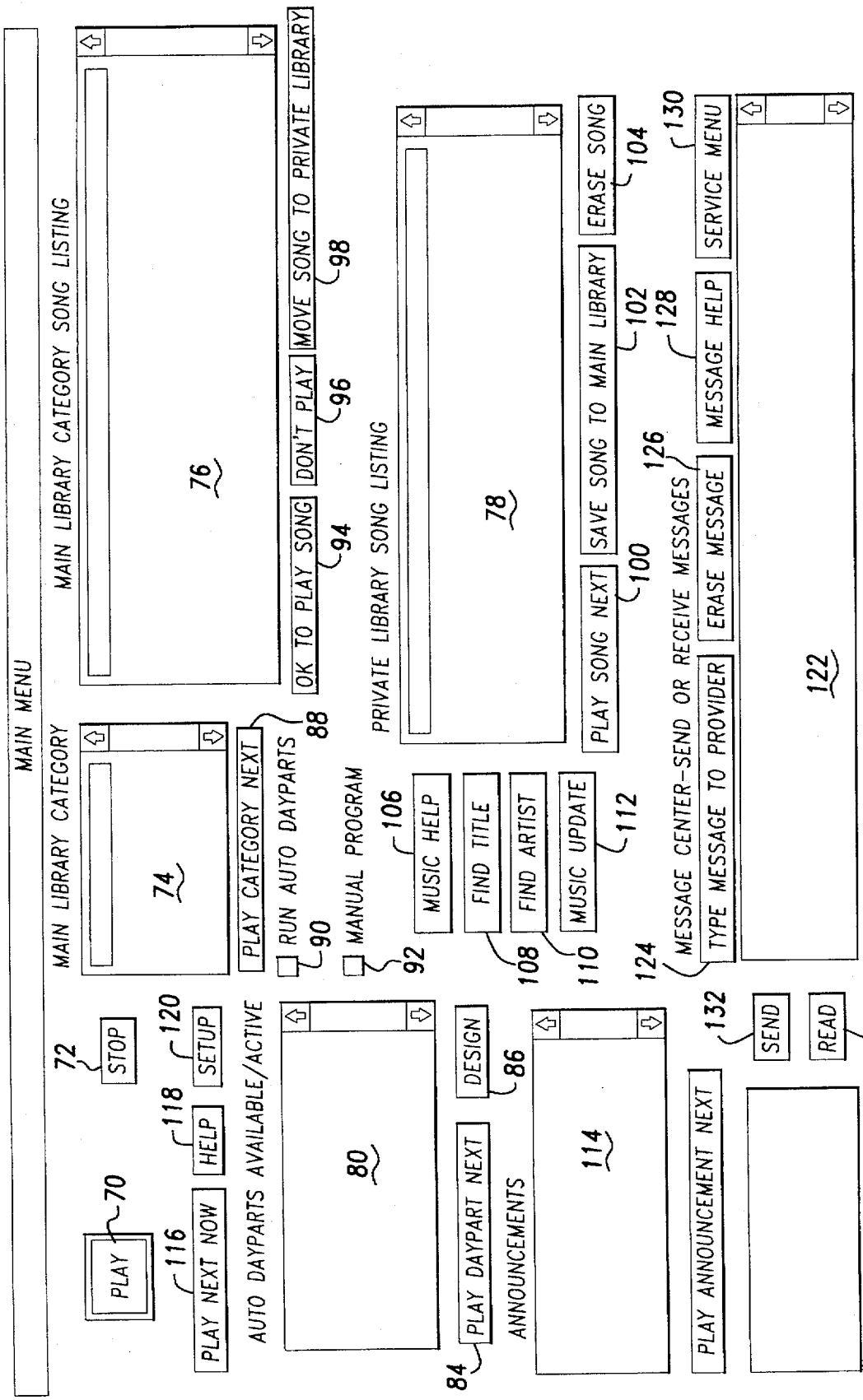

CONTINUOUS PLAY BACKGROUND MUSIC SYSTEM

BACKGROUND OF THE INVENTION

1. Field of the Invention

The present invention relates generally to a background music system and, more specifically, to a system for providing continuous play music from a source location to a plurality of end locations in which the content and arrangement of every audio content item available on the system is capable of being customized by each end user.

2. Description of the Prior Art

Background music systems for use in commercial, entertainment and other types of business establishments are well known in the art. The purpose behind such systems is typically to provide the appropriate musical or other audio input to help create a desired atmosphere for the business.

In many instances, each store of a large chain or franchisee operation currently receives background music through either a satellite radio broadcast or an FM subcarrier frequency broadcast transmitted by a provider. While providing an economical way for receiving background music, the drawback of such a system is that all of the end users are limited to the format in which the music is transmitted and no one end user can customize the format to fit his or her particular needs. This is particularly a disadvantage for a store owner who would like to be able to run specialized announcements mixed into the musical and background audio formats of the broadcast. About the only alternative a store manager currently has to provide an on-site message is to manually interrupt the background format and read the message live or play a recorded message. A more obvious limitation is that such a system is further limited to use by a participant store of the chain or franchise.

U.S. Pat. No. 5,355,302, issued to Martin et al., teaches a system for managing a plurality of computer jukeboxes in which a central management computer system monitors and selectively updates a separate library in each of the jukeboxes by a phone line extending between the central system and each of the end systems. The master system has the capability of adding and erasing song titles to and from the subset libraries using digital audio compression (DAC) techniques as are known in the art and a user would operate the jukebox in a conventional fashion by selecting a song title from the subset library.

While the computer jukebox system of Martin is well suited for its specific purpose, that being coin operated request play of specific musical selections, it is not suited for use as a continuous play broadcast system by a merchant. The system of Martin further does not provide the end user the ability to customize either the content or format of the continuous play system, as well as insert appropriate announcements and advertising when and where desired.

U.S. Pat. No. 5,341,350, issued to Frank et al., also discloses a coin operated jukebox which is connected to a central music store by a data communication line and is capable of retrieving digital/analog audio information in real time from the central store. As with Martin, Frank is not suited for use as a continuous play system and furthermore does not permit the end user with any customization options.

SUMMARY OF THE PRESENT INVENTION

The present invention is a continuous play broadcast system which provides a central computer in communication with and separately accessible by each of a plurality of end user computers for providing the end user computers with customized musical and voice commercial announcement formats. The central computer includes a drive which is loaded with a quantity of digitized audio files representing various musical selections and other messages. The end user computers each also include subsets of digitized audio files in remote drives, the end user computers each further having a display means, a digital to audio conversion means and an audio output means.

The central computer includes interface/update capability for separately and selectively updating the files of each of the end user computers at desired intervals. A digital compression algorithm is employed for transmitting the digitized files over a phone line connecting the computers together, enabling the update process to occur in reduced time during non-business hours. Each of the end user computers further includes a keyboard and/or mouse which is used with the display means for custom programming a desired musical and announcement format. The end user computers can transmit requests to the central computer for specific announcements and/or musical selections to be downloaded to the end user computer.

In a first preferred embodiment, one or more regional computers are located within a given telephone area code and function as bridging devices between the central computer and a set of end user computers. The purpose of the regional computers is to facilitate the transfer of information between the central and end user computers and to limit telephone line costs by providing a single line between the central computer and the given regional computer for sending and receiving files, the regional computer in turn updating the user computers within the given area code.

In a further preferred embodiment, the bridging device is provided in the form of a web page posted on the Internet and in communication with the central computer. The web page includes information relating to digital audio, text, graphics and data files needed to operate the end user computers. Each remote customer installation would dial into the web page via the world wide web and would be able to submit requests and download information as needed.

BRIEF DESCRIPTION OF THE DRAWING

Reference will now be had to the attached drawings, when read in combination with the following specification, wherein like reference numerals refer to like parts throughout the several views, and in which:

FIG. 1 is a schematic of the continuous play broadcast system according to the present invention;

FIG. 2 is a logic diagram of a programmed update of an end user computer by the central computer;

FIG. 3 is a main menu page of an end user computer for establishing a continuous play program and for preparing and transmitting a request to the central computer;

DESCRIPTION OF THE PREFERRED EMBODIMENTS

Figure 4:
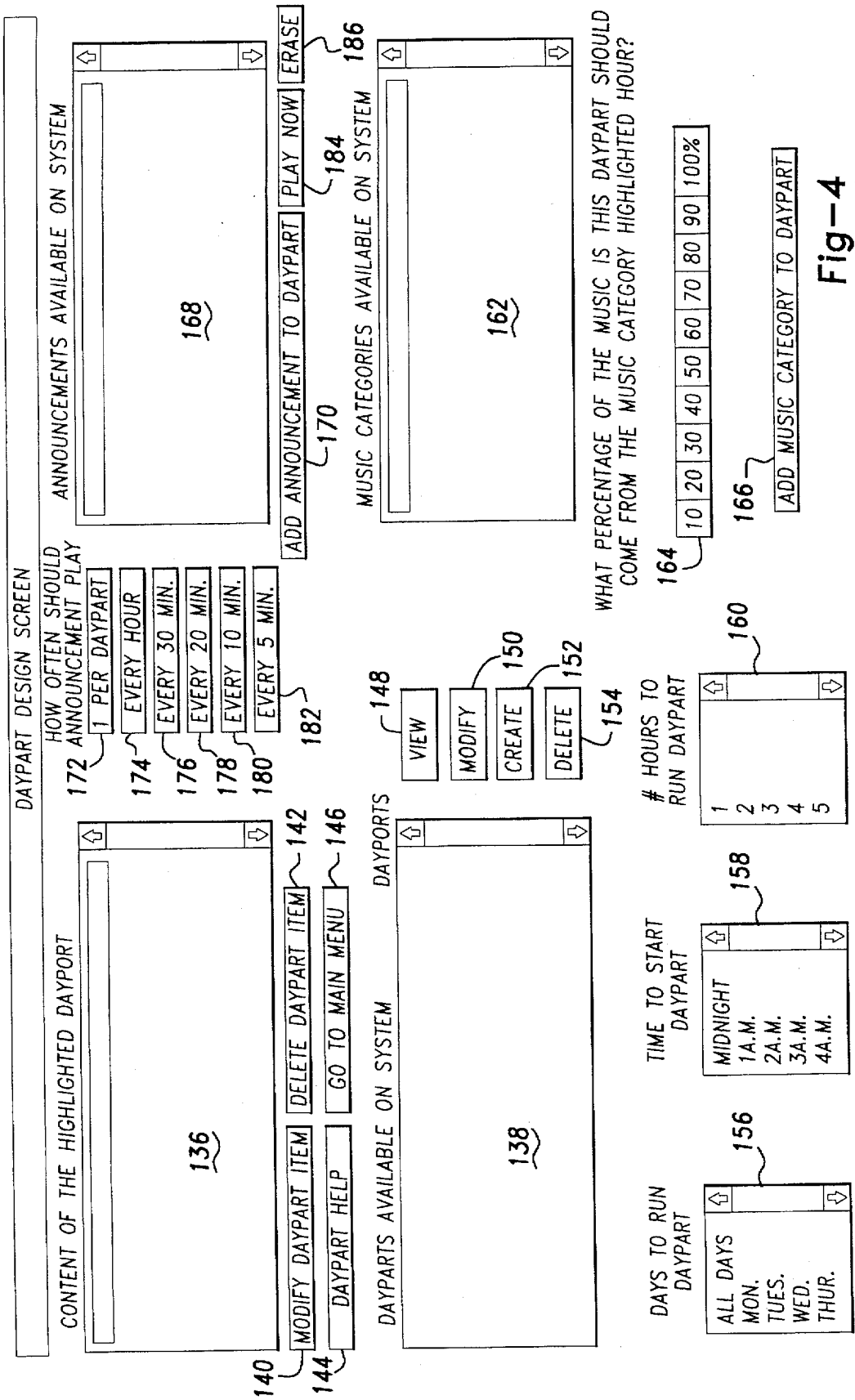
FIG. 4 is a daypart design screen which complements the main menu screen shown in FIG. 3.

Referring now to FIG. 1, a continuous play broadcast system is illustrated in diagrammatic form for connecting a central computer 10 to an unlimited number of end user computers, illustrated in plurality as end user computers 12, 14 and 16, according to the present invention. The central computer 10 includes a mainframe hard drive into which is loaded a plurality of digitized audio files which represent a master song library 18. A master announcement library 20 includes various verbal announcements which can be downloaded by the end user and a master text/graphics library 22 including graphics presentation data. The graphics data is provided in the form of a screen saver which appears on the end user's display monitor and provides information relating to advertising and information from the provider.

The files represent musical selections and verbal announcements and are loaded into the main drive of the central computer in a digitized form as is known in the art. The song library 18, announcement library 20 and text/graphics library 22 can all exist on the same computer drive or separate drives as data carrying capacity and convenience dictate. A compression algorithm is provided as is known in the art for reducing the number of bits needed to store an audio program and enables the digitized files to be compressed from a size corresponding to uncompressed linear digital bitrates to a rate equal to approximately between one-fifth and one-sixth that of an uncompressed file. The significance of transmitting the digitized files in reduced time over the telephone line connecting the central and end user computers will be subsequently described.

In a preferred embodiment of the present invention, an intermediate bridging station 24 interconnects the central computer 10 to the end user computers 12, 14 and 16. A communication link, preferably a telephone line 26 or a satellite link or other wired or wireless means, connects the central computer 10 to the intermediate bridging station 24. The central computer 10 has a modem 27 which dials into a modem 28 of the bridging station 24 when it is desirable for a plurality of digitized files to be transmitted from the central drives 18, 20 and 22 to the bridging station 24. The bridging station 24 is in turn accessible by the end user computers 12, 14 and 16 by a modem 30 through phone lines 32, 34 and 36 which dial into the bridging station through modems 38, 40 and 42, respectively.

The advantage of the bridging station 24 is that it can connect to the central computer 10 by a single phone line and can in turn service a large number of end user computers which separately connect to the bridging station 24. The bridging station 24 is provided by either a regionally placed computer or an Internet web page site, as will be described subsequently in the preferred embodiments. The bridging station 24 may further be utilized as an intermediate station for updating selective end site computers from the central computer 10 or may simply be used as a conduit for a direct transmission between the central 10 and end site computers 12, 14 and 16.

Referring again to FIG. 1, the features of end user computer 16, which is representative of any of the end user computers, are shown. A subset plurality of digitized files copied from the central computer is stored in a hard disk drive 44 of the end user computer which functions as a remote library. A floppy disk drive 46 and a CD rom drive 48 are also provided for storing digitized data transmitted from the central computer 10. In the case of the CD rom drive 48, updates are provided on disks (not shown) which are sent by the provider to the end user. The CD rom disks are normally reserved for very large end users and are capable of holding amounts of digitized information which are far in excess of what can be transmitted in the form of compressed digital data over a realistic time frame. The storage medium may also be in the form of a random access memory (RAM), now shown, which permits it to interface with one central file server to make possible multiple simultaneous playback of different customized play formats in different areas of the end user place of business. This would particularly be of advantage to a very large end user such as a hotel or casino where it is desirable to provide different music and/or announcement formats in different areas.

A hardware security key included in the form of a digital audio adapter card 50 prevents the system operating software from functioning on any other computer. The security system software program also provides the feature of shutting down the end user system after a predetermined time interval in the event the user disconnects the phone line connecting to the central computer in an attempt to avoid payment. This is accomplished by the system software program requiring a reauthorization signal or code from the central computer at the desired time interval, such as every ten days, in order for the end user system to continue operating.

A processing/decompression circuit is provided in the adapter card 50 and facilitates the receipt, storage, and subsequent play of the digitized audio files by taking the stored stream of compressed digitized audio bits and converting them to analog audio signals in real time. An audio conversion and reproduction circuit (not shown) receives the digitized stream of audio bits and converts them back to an analog audio line level signal for subsequent play through a speaker equipped with an audio output amplifier 52. A display means 53, typically a computer video monitor, is utilized in combination with a keyboard 54 and computer mouse 55 for customizing a continuous play program and for preparing and transmitting requests to the central computer system as will be subsequently described.

In a preferred commercial embodiment, the customer end user system is provided as a 386/486 Pentium PC equipped with a 500meg-2 gigabyte hard disk drive, a VGA Monochrome or color monitor, a 14.4/28.8 kbaud modem and a digital audio playback card. A mouse, a keyboard, a floppy disk drive and CD rom drive are also provided. In the simplest embodiment, the computer is hooked into a phone line and turned on to begin playing the appropriate music without further user input. In additional variants, the user device is an interactive system which allows for the playing of requested songs in real time and the ability to program and store sequences of songs and announcements for quick recall. The end user system can also be tailored for use by a professional DJ and would provide an appropriate lap-top or other computer device which plugs into the phone line and includes stereo audio output capability and a music management system for providing quick recall and play of desired musical selections.

Referring to FIG. 2, a control diagram is shown of the end user request means and the central computer interface/update means. The central computer dials into the desired end user computer to start the sequence at 56 and establishes communication at step 58 either directly or through the bridging station 24. At step 60, the central computer reads customer requests sent from the end user system having to do with musical selection updates, announcement requests, billing information and other matters. At step 62, the central computer processes the customer requests and at step 64 transmits the requested updates in the form of adding or deleting digitized musical files, providing customized announcement messages and/or answering other miscellaneous queries. At step 66, the central computer provides other updates in the form of advertising announcements and other housekeeping matters relating to billing, payment, etc., and at step 68 terminates the communication by logging off the phone line.

Referring to FIGS. 3 and 4, a main menu and daypart design screen menu are illustrated for use with the end user's keyboard and mouse for customizing a continuous play broadcast and for preparing and transmitting requests to the central computer system. The main menu is of a type capable of being presented in a Microsoft Windows or Apple Macintosh format and is accessible by the end user typing in the appropriate command into the keyboard and/or moving the mouse curser to the appropriate position and clicking on.

The system is designed so that it will automatically provide a continuous play program comprising one of a number of different types of formats. A play command 70 and a stop command 72 are provided for starting and stopping the continuous play broadcast. A main library category 74 window indicates the various different classifications of music available by format and a main library category song listing 76 lists all the various different individual musical selections by title which are available for each different music category. During scheduled updates, the central computer will add and delete musical selections to the song category 76, however an end user can save desired selections to a private library song listing 78 which contains a limited amount of space for saving special selections.

An auto dayparts available/active box 80 enables the user to program different format types or patterns of music for different times of the day. As an example, one such format of music may be desired for the morning and another for the afternoon hours. A desired daypart format can be triggered by clicking the mouse cursor on play daypart next box 84 and the daypart arrangement can be changed by clicking on design box 86. The manner in which the dayparts are designed will be subsequently described with reference to the daypart design screen.

Play category next box 88 triggers the system to play the desired format of music in a random fashion immediately and box 90 triggers a run auto dayparts command so that a specifically designed dayparts program is triggered. A manual program box 92 enables the user to manually program the order of play of musical selections either within a single format or a number of different formats.

Once the cursor is located on a given selection within the library category song listing 76, the song can be played by clicking on OK to play song box 94, not played during automatic playback by clicking on don't play box 96 or moved to the private library by clicking on move song to private library box 98. Within the private library song listing 78, a desired selection can be played immediately by clicking on play song next box 100, moved to the main library by clicking on box 102, or erased by clicking on box 104. A music help box 106 assists the user in locating a musical selection and includes a find title command box 108 and a find artist command box 110. An announcement listing is indicated at box 114 and the types of announcements which are available will be described in the following dayparts design screen. A play next now command 116 causes the song or announcement being played to be interrupted and the next song or announcement to be played immediately. A help command 118 provides instructional information to the user and a setup command 120 assists the user in setting up the system parameters or a desired preloaded program.

A message center box 122 is provided for enabling the user to transmit questions and requests to the central computer. Such requests typically would be for specific musical selections or for the preparation of an announcement tailored for use by the end user. A type message to provider box 124 is clicked on to enable a message to be prepared. The user further has the options of an erase message box 126, message help box 128 and service menu box 130 which lists the repair and emergency services which are available to the user. Send box 132 transmits a prepared message to the central computer and read box 134 makes visible a message which has been received from the central computer.

Referring now to FIG. 4, the daypart design screen menu is shown for arranging a continuous play musical format and for selecting prepared announcements to be played at given time intervals. The highlighted daypart box 136 indicates the contents of the daypart portion which are selected from a dayparts available on system box 138. These contents normally include the different musical categories and other announcements that are included within the selected daypart portion from box 138. Daypart available box 138 usually contains the same information which is stored on the auto dayparts available/active box 80 in the main menu screen.

A highlighted daypart portion can be modified by clicking on box 140 or deleted by clicking on box 142. Help box 144 provides assistance to the user as to the features of the daypart menu and box 146 is a window between the daypart menu screen and the main menu screen. View box 148 displays the highlighted daypart on box 138 which can be modified by clicking on box 150. A daypart can further be created by clicking on box 152 or deleted by box 154.

The scheduling of the daypart sections is controlled by the days to run daypart box 156, time to start daypart box 158 and hours to run daypart box 160. By arranging the play of the various dayparts over different time frames, the user can tailor a continuous play program which runs continuously for the entire business day or for entire 24 hour periods as desired.

A complete listing of all available music categories available on the system is indicated in box 162. A specified amount of musical selections from within the category can be selected by cursoring to box 164 and highlighting the desired percentage and the selection can be added to the desired daypart by highlighting box 166.

Box 168 lists the announcements available on the system which include sales advertisement and other things. As previously described, the user has the ability to request a customized announcement to be prepared from the central office by using the message feature on the main menu page. Alternatively, the user can call up a prepared announcement from the list 168 and insert it into the customized continuous play format by clicking on add announcement to daypart box 170. This is accomplished by cursoring to the appropriate frequency bar and clicking on. Box 172 will insert the selected announcement into the broadcast programming once daily, box 174 every hour, box 176 every half hour, box 178 every 20 minutes, box 180 every 10 minutes and box 182 every 5 minutes. An announcement can be immediately played by clicking on play now box 184 and can be erased by clicking on box 186.

Between the main menu page and the design daypart schedule an end user can customize a continuous play program which will run during a stores operating hours up to around the clock seven days a week. The end user further has the ability to customize the type and content of music by format from the available music stored in the remote library and can further add announcements when and where desired. Finally, the message means permits the user to request song updates and customized announcements from the central computer.

Figure 5:
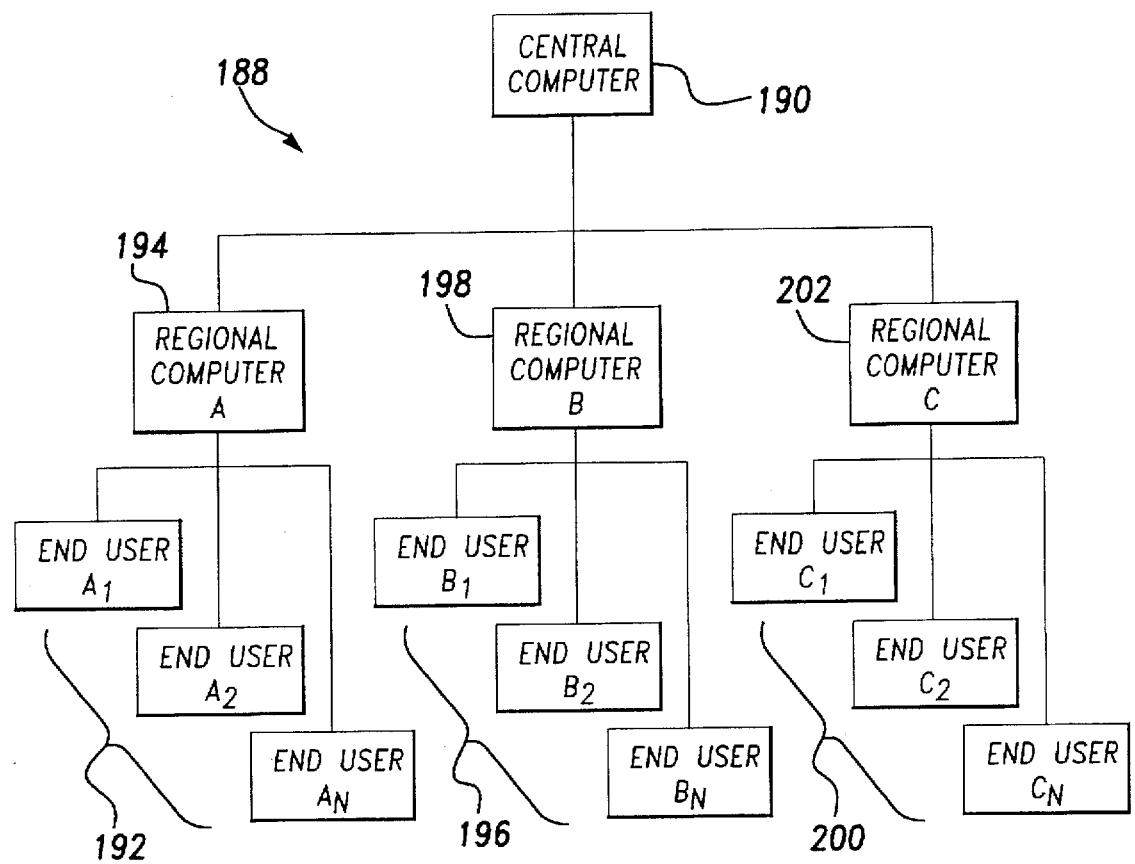
FIG. 5 is a view of the continuous play broadcast system utilizing regionally placed computers located between the central computer and the pluralities of end computers according to a preferred embodiment.
Figure 6:
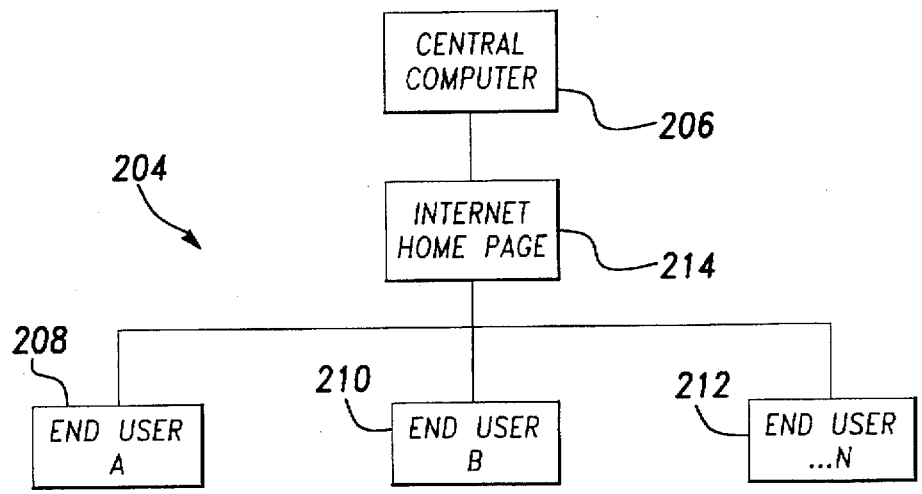
FIG. 6 is a view of a further preferred embodiment in which the end user computers are connected to the central computer via an Internet web site.

Referring to FIG. 5, a preferred embodiment 188 is shown for a continuous play broadcast system according to the present invention. According to this embodiment, a central computer 190 is connected to a first plurality of end user computers 192 by a first regional computer 194, to a second plurality of end user computers 196 by a second regional computer 198 and to a third plurality of end user computers 200 by a third regional computer 202. The regional computers perform the function of the bridging stations indicated in FIG. 1 and are each placed within a local telephone exchange area and separately connect each end user computer with the central computer. In this fashion, the connect costs associated with the updating of the system are limited by having only a single long distance line connecting the central computer to the regional computer.

In the preferred manner of operation, the central computer 190 reads all customer requests relating to musical selections, announcements and billing information from the regional computers 194,198, and 202 and subsequently downloads all desired updates to the regional computers at specific intervals. The regional computers in turn take the compressed digitized files and transmit them via modem to the end user computers. The update process can preferably be accomplished at reduced time during non-operating hours such as the middle of the night when phone costs are at a minimum and, in the case of smaller establishments, can utilize a single phone line which may also act as a modem line.

In a further preferred embodiment, a continuous play broadcast system 204 includes a central computer 206 which is connected to an unlimited quantity of end user computers, indicated as 208, 210 and 212, by an Internet web page 214. The web page 214 includes data relating to digital audio, text, graphics and other of the pre-described features needed to operate the system. The web page according to this embodiment performs the functions of the bridging station and permits an unlimited number of end users to have access to the system at any time.

The present invention therefore illustrates a continuous play broadcast system in which an end user such as a store manager is in communication with the central supplier and can customize the type, format and selections of the music played and announcements relating to the business. Large scale customers could also be serviced directly from the source provider through a CD rom reader which would provide most or all the available music formats to the end user.

The continuous play system may also be used by a disc jockey having the necessary digital to audio conversion equipment and utilizing a portable or laptop computer with sufficient drive capability which is hooked into a phone line connected to the main system. A variant of this type of system would provide the ability to play requested songs in real time and to program and store sequences of songs and announcements for quick and convenient recall either in real time or on a programmed time alert basis.

Having described my invention, further embodiments will become apparent to those skilled in the art to which it pertains without deviating from the scope of the appended claims.

I claim:

1. A continuous play broadcast system, comprising:

a central computer having a drive containing a first quantity of digitized audio files which define a master library;

at least one end user computer in communication with said central computer and containing a second subset quantity of digitized audio files which define a remote library, said at least one end user computer having a display means, a digital to audio conversation means, and an audio output means; and said at least one end user computer further comprising continuous program play customizing means for selecting and arranging any number of desired audio formats from said second subset quantity of digitized audio files within said remote library and in a continuous play fashion, said end user computer further comprising request means for soliciting additional quantities of files from said central computer, said central computer further comprising interface/update means for responding to said request means and for updating said remote library of end user computer files at preselected intervals.

2. The continuous play broadcast system as described in claim 1, further comprising at least one intermediate bridging device for operatively connecting said central computer to said at least one end user computer.

3. The continuous play broadcast system as described in claim 1, said central computer further comprising a compression circuit for enabling transmission of said digitized files by said interface/update means at reduced time to said at least one end user computer, said end user computer having a processing and decompression circuit for decompressing said compressed digitized files prior to playback.

4. The continuous play broadcast system as described in claim 2, said at least one bridging device comprising at least one regional computer located within a given telephone area code and connected to said central computer by a modem and a telephone line, said regional computer receiving digitized files through said interface/update means and transmitting a selected subset of said files separately to each of a plurality of end user computers.

5. The continuous play broadcast system as described in claim 2, said at least one bridging device comprising an Internet home page which transmits requests from the end user computers to the central computer and which receives digitized audio files from said interface/update means which are subsequently downloaded by the end user subscribers into said remote libraries.

6. The continuous play broadcast system as described in claim 1, said continuous play program customizing means and said request means further comprising a main menu page and a daypart design screen page which are accessed through a keyboard and mouse connected to said end user computer and said display means.

7. The continuous play broadcast system as described in claim 6, said play program customizing means enabling an end user to customize a continuous play broadcast by musical format and by announcements selected from said remote library and updated by said interface/update means.

8. The continuous play broadcast system as described in claim 6, an end user utilizing said request means to transmit musical selection and customized announcement requests to said central computer.

* * * * *